United States Patent [19]
Frentress

[11] Patent Number: 5,669,183
[45] Date of Patent: Sep. 23, 1997

[54] DEVICE AND METHOD FOR PROTECTING BALED HAY FROM MOISTURE

[76] Inventor: Kurt B. Frentress, P.O. Box 282, Hayden, Colo. 81639

[21] Appl. No.: 406,318

[22] Filed: Mar. 17, 1995

[51] Int. Cl.⁶ ........................................ E04B 1/34
[52] U.S. Cl. .......................... 52/4; 52/3; 206/83.5
[58] Field of Search ................... 52/3, 4; 206/83.5

[56] References Cited

U.S. PATENT DOCUMENTS

| | | |
|---|---|---|
| 19,689 | 3/1858 | Dinsmoor. |
| 621,798 | 3/1899 | Deems. |
| 715,603 | 12/1902 | Quarrie et al. ............... 52/4 X |
| 720,611 | 2/1903 | McFarlane. |
| 754,811 | 3/1904 | Schlichter. |
| 850,672 | 4/1907 | Novak ............................ 52/4 |
| 2,705,557 | 4/1955 | Hartman. |
| 4,041,654 | 8/1977 | Nedila ............................ 52/3 |
| 4,248,343 | 2/1981 | Schaefer. |
| 4,712,672 | 12/1987 | Roy et al.. |
| 4,907,380 | 3/1990 | Jannin ........................ 52/3 X |

FOREIGN PATENT DOCUMENTS

| | | |
|---|---|---|
| 2 026 056 | 1/1980 | United Kingdom. |
| 2 263 395 | 7/1993 | United Kingdom. |

*Primary Examiner*—Wynn E. Wood
*Assistant Examiner*—Timothy B. Kang
*Attorney, Agent, or Firm*—Davis, Graham & Stubbs

[57] ABSTRACT

A circular disk approximately 6 feet in diameter and approximately 0.50 inches thick, having a small hole through the center of the disk for engagement with a screw or a spike, and method of using the same. The user places the disk atop one or more bales of hay standing on end, and secures the cover to the topmost bale by engaging a screw or spike through the center of the cover and into the bale of hay.

2 Claims, 3 Drawing Sheets

DEVICE AND METHOD FOR PROTECTING BALED HAY FROM MOISTURE

FIELD OF THE INVENTION

The field of the invention relates generally to covers for straw, hay and the like, and more particularly to a device and process for covering hay that is gathered into bales to protect the hay from moisture and/or sun damage.

BACKGROUND OF THE INVENTION

The need to protect hay from rain or other elements of weather such as glaring sun, has long been appreciated. Hay, when left in the cutting field or otherwise exposed to the weather, tends to rot and deteriorate. Machines are currently used to roll hay into large cylindrical bales measuring about 5 to 6 feet in diameter. These bales weigh about 1200 to 2000 lbs. These machines typically operate in the field where the hay or straw is cut. It is readily understood that movement of hay, once rolled into bales of this size, is a difficult task. Field storage of such bales is therefore appropriate. However, if the baled hay or straw is stored in the field, protection against deterioration due to sun or moisture is highly desirable.

As indicated by the prior art, protective coverings for bales of hay are not uncommon. For example, U.S. Pat. No. 4,248,343 of Schaefer teaches a device for protecting baled hay from moisture damage that includes a cover that fits over a single bale of hay resting on the ground, on its side. The cover consists of a single sheet of flexible material having fasteners that project into the bale of hay to keep the cover in place.

U.S. Pat. No. 5,197,236 of Calhoun et al. discloses a cover for piles of hay. The cover of this invention is designed to protect a multiple bale stack arranged in a pyramid-like structure. The cover, which consists of a single sheet of flexible material is draped over the top of the pyramid and extends downwardly over the sides of the pyramid. Along the hem of the cover is a series of U-shaped rods to which are attached a series of tie strands. The tie strands are attached to the ground along the sides and to the center, middle bale in the front and back, to secure the cover over the bale of hay.

U.S. Pat. No. 4,712,672 of Roy et al. teaches a single bale type cover which is shaped at the top complimentary to the upper half of a bale lying on its side, while the rest of the cover drapes down to the supporting surface (in most cases the ground). The cover is gathered at the bottom near the supporting surface by a tie rope that extends around all the sides.

Even before the time that machines were available to roll hay into large cylindrical bales, and hay was left sitting loosely piled in the field, the need to cover the pile of hay was appreciated. For example, U.S. Pat. No. 19,689 of Dinsmoor discloses a hay stack cover that resembles a tent or tepee-like structure. The cover, square in shape, is draped at its center over the top of a pile of hay. The top is fastened to the pile by a long spike that extended downwardly through the center of the haystack. The sides are fastened to the ground by spikes along the periphery of the cover.

U.S. Pat. No. 720,611 of McFarlane discloses a cover for hay piles in the shape of an inverted cone formed of a non-flexible material such as metal. The cone has a horizontal flange about the periphery on the lower edge. The cone-shaped cap is fastened to the pile of hay by the use of a large corkscrew that extends downwardly into the pile of hay.

U.S. Pat. No. 621,798 of Deems discloses a cover or roof for protecting a pile of grain or hay. The cover is secured to the pile of hay by use of a long stake or spike pivotally attached to a ridge pole located on the inner center of the roof. The roof of this invention is broken down into sections fastened to each other by hinges in order to accommodate piles of hay of various sizes and widths.

As seen by the prior art, devices have been developed that cover a stack or pile of hay rolled into bales and left in a field. Also, devices have been developed that cover hay left loosely in a pile. However, it can be seen that none of these devices completely solves the problem of providing a hay cover that minimizes the surface area of hay in contact with the ground, and provides an easy to use cover that maximizes storage space.

SUMMARY OF THE INVENTION

One of the principal objects of the present invention is to provide a device and process for protecting hay that is gathered into bales so that the bales can be stored outside for extended periods of time with little damage to the hay. Another object of the invention is to provide a device and process for protecting hay that minimizes the surface area and the number of bales of hay that rest upon the ground exposed to water damage. It is yet another object of the invention to provide a device and process that eliminates a pyramid shaped stack for storing hay, and therefore eliminating water damage at the points where the bales of hay intersect in the stack. It is an object of the present invention to provide adequate covering for bales of hay stored in cylindrical columns, with a slight overlap around the edge of the column that will divert water away from the hay while allowing the columns to be placed closely together.

Other objects of the invention include providing a device of the type stated which is capable of being anchored or secured firmly to a hay bale so that it will remain in place even in the presence of a heavy wind. It is an object of the invention to provide a device that is simple in construction and easy to manufacture.

These objects are achieved by the hay bale cover and method of using according to the present invention. In one embodiment, the hay bale cover includes a large circular disk and a screw or spike for fastening the disk to the hay.

The large circular disk is approximately 6 feet in diameter, and approximately 0.25 to 0.5 inches thick. This is designed to be compatible with placement of the disk on top of a bale standing on end, or on top of a pile of bales standing one on top of the other. According to the practice of the present invention, bales of hay are stacked on end rather then on their side, so as to minimize the surface area of the bale left resting on the ground as found in the storage methods in the prior art.

In the center of the circular disk is a hole with approximately 1 inch diameter. The hole is designed to be operatively compatible with either the screw or spike attachment means. Once the circular disk is placed on top of the bales of hay, the screw or spike is engaged through the hole in the center of the disk and into the bale of hay. Using either the screw or spike, the disk is securely fastened to the flat upper surface of a bale of hay.

In another embodiment, the hay bale cover of the invention consists of a reusable waterproof cover shaped to enclose the top portion of a substantially large, cylindrical hay bale or several cylindrical hay bales standing on end. The cover has a circular top portion with a sleeve extending generally downward therefrom. The lower end of the sleeve incorporates an elastic draw string hemmed into the lower peripheral edge defining the open bottom of the cover, for securing the cover on the bale of hay. Alternatively, an elastic bungee strap having a hook on each end, the hooks being engaged with a pair of metal rings mounted on the lower peripheral edge of the sleeve, may be used to secure the cover over a bale of hay.

In either embodiment of the present invention, the bales of hay are stacked on end rather then on their side, so as to minimize the surface area of the bale left resting on the ground as found in the storage methods in the prior art.

DETAILED DESCRIPTION OF THE PREFERRED EMBODIMENT

Figure 1:
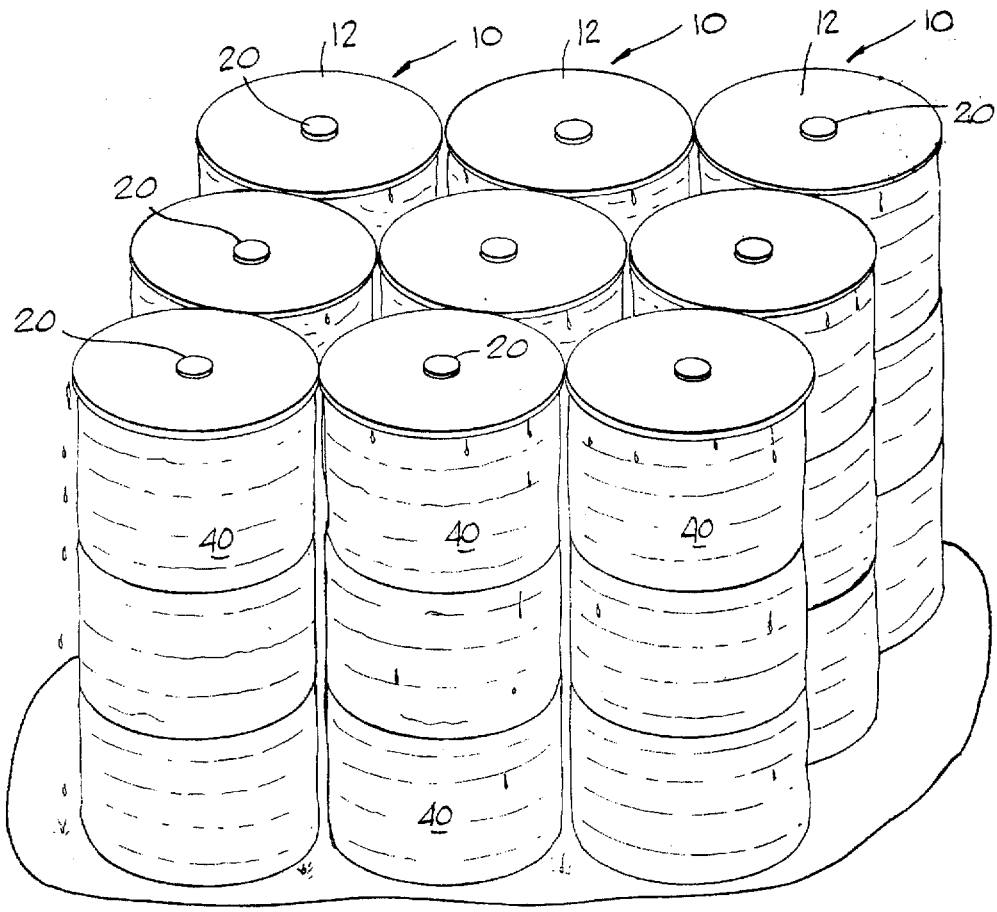
FIG. 1 is a perspective view of the bale cover of the invention.

With reference to FIG. 1 it can be seen that the first embodiment of the bale cover of the invention is a disk designed to fit on the flat, upper surface of a bale of hay 40. As indicated by this figure, the diameter of the disk 10 should be fractionally larger than the diameter of the bale of hay 40 so that water may run off the side of the bale cover and not run down the sides of the bale of hay. The diameter of the bale cover should also be sized to allow multiple columns of baled hay to be stacked closely together. Although FIG. 1 depicts a view of three rows of baled hay stacked and covered closely together, it is readily understood that the practice of this invention is compatible with as many rows and columns of baled hay as the user sees fit.

Figure 2:
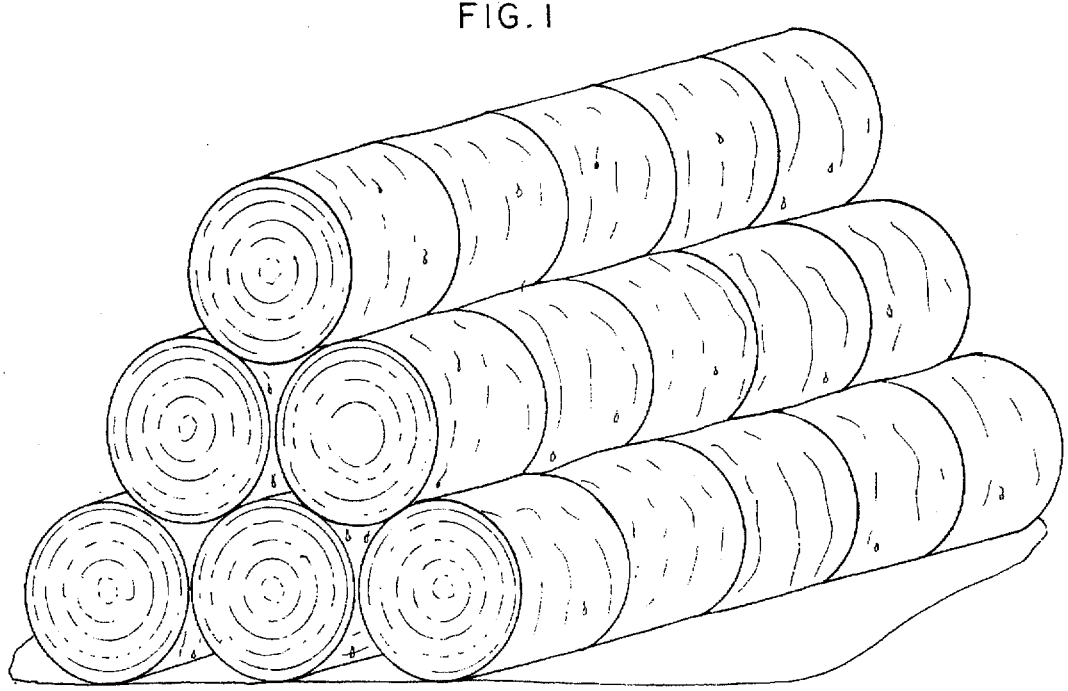
FIG. 2 is a perspective view of one way bales of hay are stacked in the prior art.

In comparison to FIG. 2, which depicts one way that baled hay is stored in the prior art, the advantages of the present invention are apparent. In practice according to the present invention, a smaller surface area of the baled hay rests on the ground, thus minimizing water or insect damage to the hay. In the pyramid-like structure of the prior art, water runs off the topmost bale and down the sides of the pyramid, causing water damage to the exposed top and sides of the stacked bales. The present invention, in contrast, stacks the bales of hay on end and covers them at the top, causing water to run off the side of the bale cover and down to the ground, not touching the sides or top of the hay.

Figure 3:
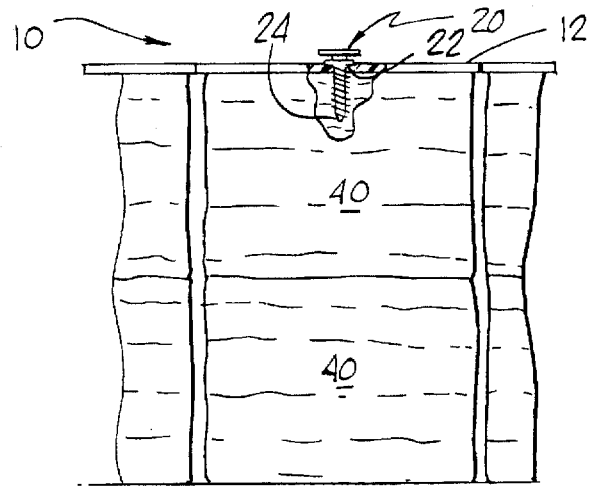
FIG. 3 is a side cross-sectional view of the bale cover of the invention.

Continuing now with reference to FIG. 3, it can be seen that in a preferred embodiment the bale cover of this invention consists of a large circular disk having a diameter of 6 feet. This is consistent with yet fractionally larger than the diameter of a cylindrical bale of hay. Typically, hay is rolled into bales that are approximately 5 to 6 feet in diameter. It is readily understood that practice of the present invention could be extended to bales of hay having varying diameters.

As seen in FIG. 3, circular disk 10 of the present invention is formed in a unitary fashion of fiberglass, although any semi-firm to firm molded plastic material would be adequate. Alternatively, circular disk 10 may be formed of a thin, flexible sheet metal such as aluminum.

Circular disk 10 has a flat upper surface 12, although it is readily apparent that the entire circular disk 10 may be slightly curved in shape, to aid in water run off over the side.

Additionally, although not depicted in the drawings but readily understood, another embodiment of the invention may consist of a bale cover that is square in shape. The size of the squared cover would be fractionally larger than the dimensions of a squared bale of hay.

Figure 4:
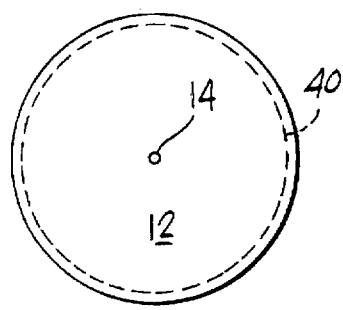
FIG. 4 is a top plan view of the bale cover of the invention.

In all of these embodiments, the bale cover of this invention has a hole 14 located in the center of the circular disk 10, as seen with reference to FIG. 4. The hole 14 measures about 1 inch or less in diameter, and is designed to accommodate a screw 18 or a spike 26 used to fasten the circular disk 10 to the bale of hay 40, as will subsequently be discussed.

Resuming the discussion with reference to FIG. 3, it can be seen that the circular disk 10 of the invention is thin. Generally, a thickness of about 0.5 inch or less would be adequate, although it should be noted that FIGS. 1 and 3 are intended to be representational only and are not drawn to scale. The overall thickness of the circular disk 10 may be thinner or thicker than indicated in the drawings, contributing to the cover's ease of use.

Figure 5:
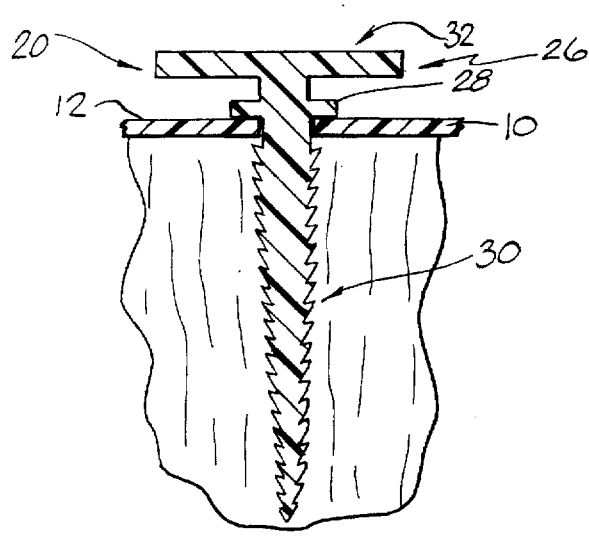
FIG. 5 side view of a spike attachment means for the bale cover according to the present invention.
Figure 6:
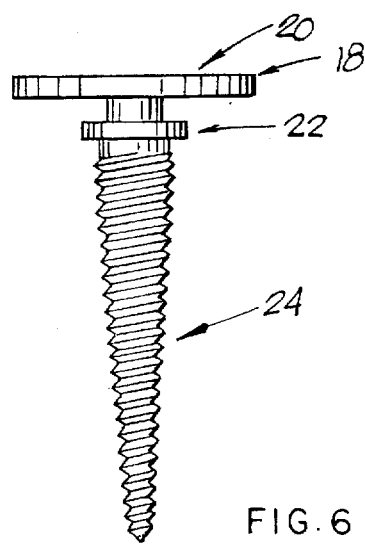
FIG. 6 is a side view of a screw attachment means for the bale cover according to the present invention.
Figure 7:
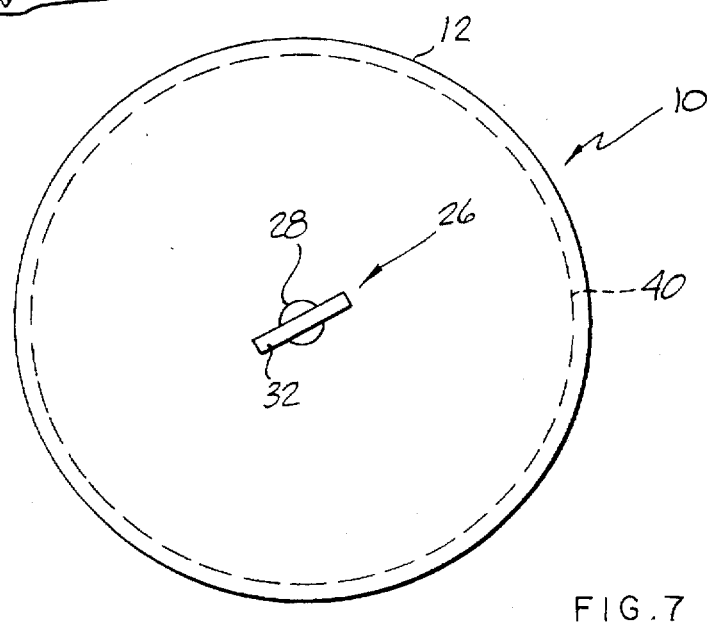
FIG. 7 is a top perspective view showing the spike attachment means used to secure the bale cover to a bale of hay.

Continuing now with FIGS. 5–6, it can be seen that the bale cover 10 of the invention may be secured to a bale of hay 40 by using a spike 26 or a screw 18 attachment means. With reference to FIG. 5, which depicts a spike 26 attachment means, it is seen that the spike 26 attachment means employs a T-shaped handle 32 on top of a ring shank 30. Securely mounted on shank 30 is a circular ring 28. The diameter of ring 28 is approximately 2 inches. The diameter of ring 28 is sized such that when the spike 26 is engaged through the center hole 14 of the circular disk 10 and into the hay 40, ring 28 rests flush against the upper surface 12 of circular disk 10 creating a watertight seal. This is understood with reference to FIGS. 5 and 7 which show a top perspective view of the spike 26 attachment means used to secure circular disk 10 to a bale of hay 40.

Spike 26 is engaged by inserting shank 30 through center hole 14, and into the bale of hay 40. The spike 26 is secured into the hay by the serrated edge on shank 30. Shank 30 extends approximately 8 inches into the hay bale. The serrated edge of shank 30 points in a generally upright manner, allowing the spike 26 to be easily inserted but difficult to remove. The serrated edge is best understood with reference to FIG. 5.

Alternatively, a screw 18 attachment means may be used to secure the disk 10 of the invention to a bale of hay in a similar fashion as the spike 26 attachment means, as seen with reference to FIG. 6. In a preferred embodiment, screw 18 is approximately 10 inches from bottom to top. The shank 24 of the screw 18 is approximately 8 inches long, allowing for secure engagement into the bale of hay. The t-handle 20 of the screw 18 is has a length of about 5 inches. The t-handle 20 of the screw 18 is used to twist shank 24 into the bale of hay 40.

Located on shank 24 of screw 18 is also a circular ring 22, having a diameter of about 2 inches. In use, shank 24 is inserted into the bale of hay 40 until circular ring 22 rests flush against the upper surface 12 of circular disk 10, creating a watertight seal.

Using either attachment means, disk 10 of the invention remains securely mounted on a top of a column of bales of hay, which is desirable during windy conditions. This engagement between the disk 10, attachment means and the hay bale is readily understood with reference to FIG. 3.

In use, this embodiment of the bale cover of this invention works primarily as follows: Using a typical hay-baling machine, hay is rolled into cylindrical bales approximately 6 feet in diameter and weighing approximately 1200 to 2000 lbs.

The baled hay is positioned so that one flat surface of the bale is placed in contact with the support surface which may be either the ground, a truck, the floor of a barn or the top flat surface of another bale of hay. The top flat surface of the baled hay faces upward. As many bales as desired may be placed upon one another so as to form a column-like structure, up to the limits of the stacking machine.

The circular disk 10 of this invention is placed on top of the topmost bale 40 in the column. The circular disk 10 is centered on the bale 40 such that a small lip extends about the periphery of the baled hay. Once the circular disk is in place, the screw 18 (or alternatively the spike) attachment means is placed through the small hole 14 in the center of the disk 10 and secured into the baled hay 40. As many columns of baled hay as the user sees fit may be placed in close proximity of each other.

Figure 8:
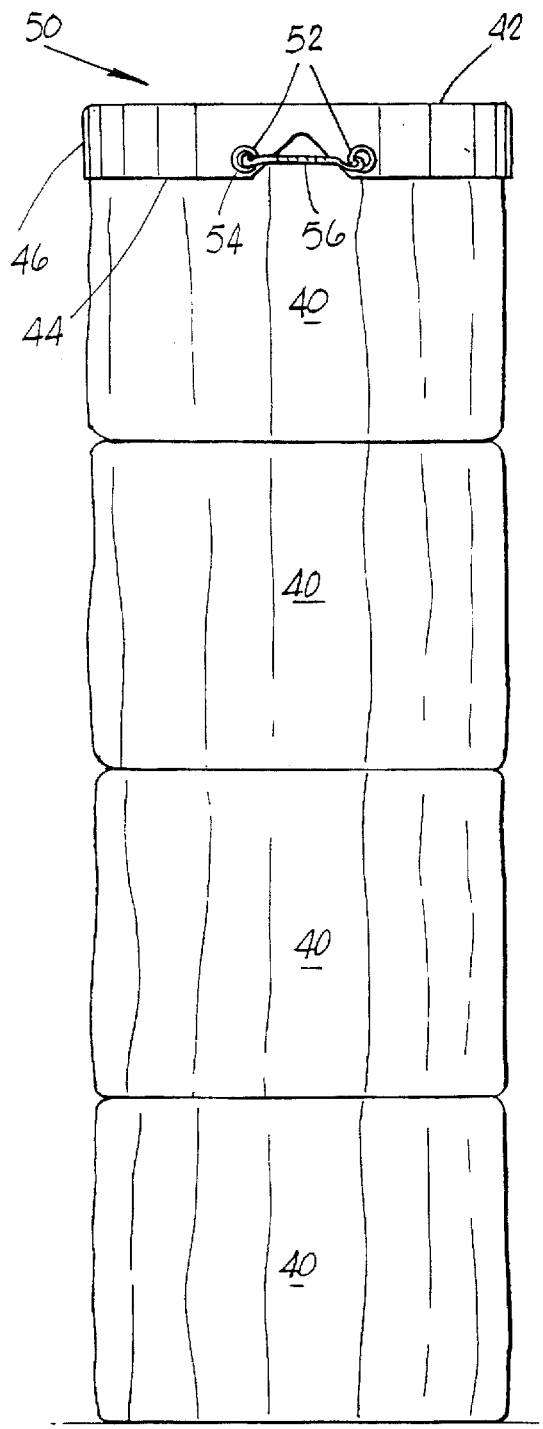
FIG. 8 is a perspective view of an alternative embodiment of the bale cover of the invention, showing a bungee cord attachment for securing the cover.
Figure 9:
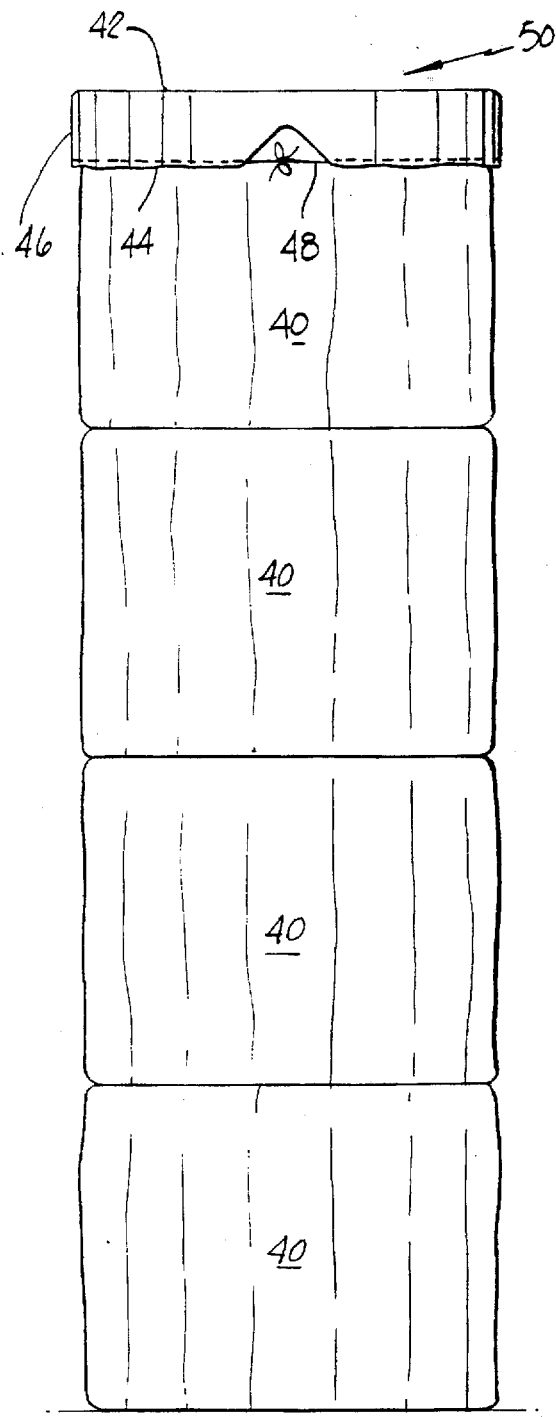
FIG. 9 is a perspective view of the alternative embodiment of the bale cover of the invention shown in FIG. 8, using a draw string for securing the cover.

With reference to FIGS. 8–9, it can be seen that the second embodiment of the bale cover of the invention is a cap 50 designed to fit over the flat, upper surface of a bale of hay 40.

The bale cap 50 is preferably formed of a relatively lightweight, waterproof, tough and durable material such as polythylene or similar plastic film material measuring about 3 to 5 mils in thickness. Alternatively, the cap 50 may be made of tarping, canvas, stretch plastic film, plastic film or any other water proof flexible material. The bale cap 50 is easily foldable for compact storage and may be reused many times if necessary.

The bale cap 50 has a central sleeve 46 which extends downward from top surface 42. Top surface 42 is circular in shape and is sized to fit over the flat, upper surface of a cylindrical hay bale 40 standing on end. The sleeve 46 extends downward over the cylindrical bale 40. The sleeve may extend partially downward over the bale 40, or alternatively may extend the entire length of the bale 40. The circumference of sleeve 46 is approximately 19 feet, based on a cylindrical bale having a radius of 3 feet.

The lower end of the sleeve 46 incorporates an elastic draw string 48 hemmed into the lower peripheral edge 44 defining the open bottom of the cap 50. The draw string 48 is used for securing the cap 50 on the bale of hay. The draw string 48 could also be rope, strong twine or the like, and may be also be separated from or attached to the bale cover adjacent to the bottom edge 44. Preferably, the bottom edge 44 is provided with an interior duct through which the draw string passes. When the drawstring is used to secure the cap 50 to a bale of hay 40, it is preferably lined up with the wiring used to bundle the bale of hay. This wiring forms a crevice that cooperatively receives the tightened lower portion 44 of the cap 50.

Alternatively, as seen in FIG. 8, an elastic bungee strap 56 may be used to secure the cap 50 over a bale of hay 40. The bungee strap 56 may vary in length, but is optimally 6 inches long, and has a metal hook 52 on each end of the strap. On the periphery of the bottom edge 44 of the cap 50 are a pair of metal rings 54, which are sewn into the cap 50 or are secured to the cap 50 using rivets (not shown). The metal rings 54 are spaced approximately 1 foot apart. The metal rings 54 are sized to receive the hooked ends 52 of bungee strap 56.

In employment of this embodiment of this invention, the cap 50 is situated over a hay bale 40 standing on end in a generally upright fashion. The cap 50 is opened and the open bottom moved downwardly to position the cover over the hay bale 40. The sleeve is then forced or tucked inwardly at the bottom or center of the hay bale 40. If tucked inward at the center of the bale 40, the tuck is preferably made at the same place as the bundling wire used by the bale machine in forming the bale. This provides a crevice or inlet sized to cooperate with the draw string or bungee cord for securing the cap on the bale. If the draw string 48 is used for securing the cap 50, the opposite ends of the string 48 are drawn together and secured to tighten the bale cap 50. If the bungee strap 56 is used the strap is extended so that the hooked ends 52 are hooked to the rings 54 located on the lower periphery of sleeve 46.

What is claimed is:

1. A combination for protecting hay from precipitation, comprising:

(a) a cylindrical bale of hay having a first circular end for placement on a ground level and a second circular end thereabove, said bale having a columnar portion extending between said first and second ends;

(b) a planar, disk-shaped circular top portion completely covering the first circular end; and (c) a unitary sleeve portion extending downward from said top portion, said sleeve portion covering at least part of the columnar portion of said bale, and said sleeve portion extending downward a uniform distance from the entire circumference of said top portion;

wherein said circular top portion is substantially waterproof.

2. A combination for protecting hay from precipitation, comprising:

(a) a plurality of cylindrical bales of hay, each bale having a first circular end and a second circular end and a columnar portion extending therebetween;
      (i) the bales being stacked vertically onto one another to form a single column, so that a circular end of each of the plurality of bales abuts a circular end of another one of the plurality of bales,
      (ii) exactly one of the plurality of bales being disposed with one of its circular ends on a ground level, exactly one other of the plurality of bales being an uppermost bale, the uppermost bale having an uppermost circular end; and (b) a cover having a planar, disk-shaped circular top portion completely covering the uppermost circular end of said uppermost bale, said cover having a unitary sleeve portion extending downward from said top portion, said sleeve portion covering at least part of the columnar portion of said uppermost bale, and said sleeve portion extending uniformly downward from the entire circumference of said top portion;

wherein said circular top portion is substantially waterproof.

\* \* \* \* \*